United States Patent Office 3,412,662
Patented Nov. 26, 1968

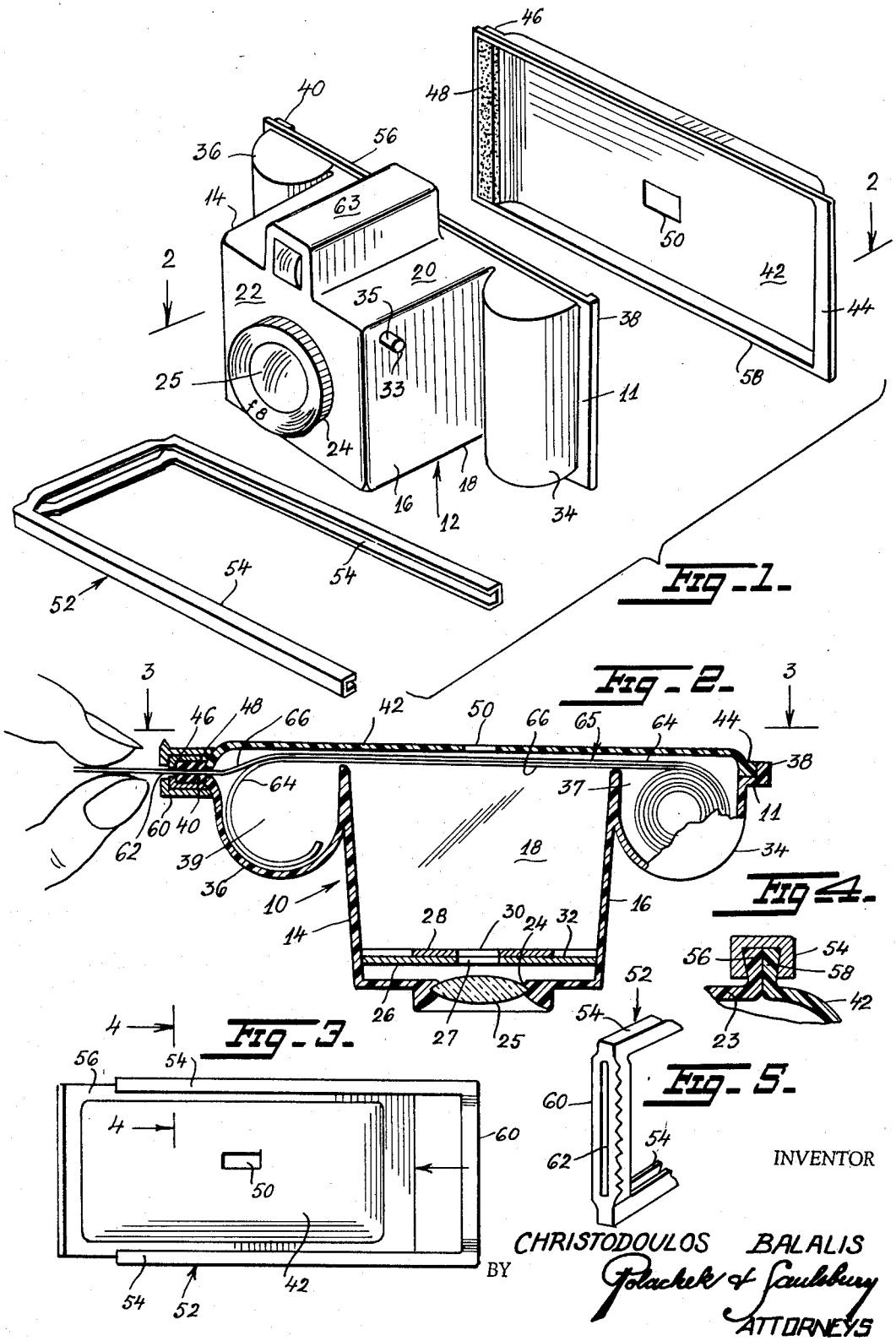

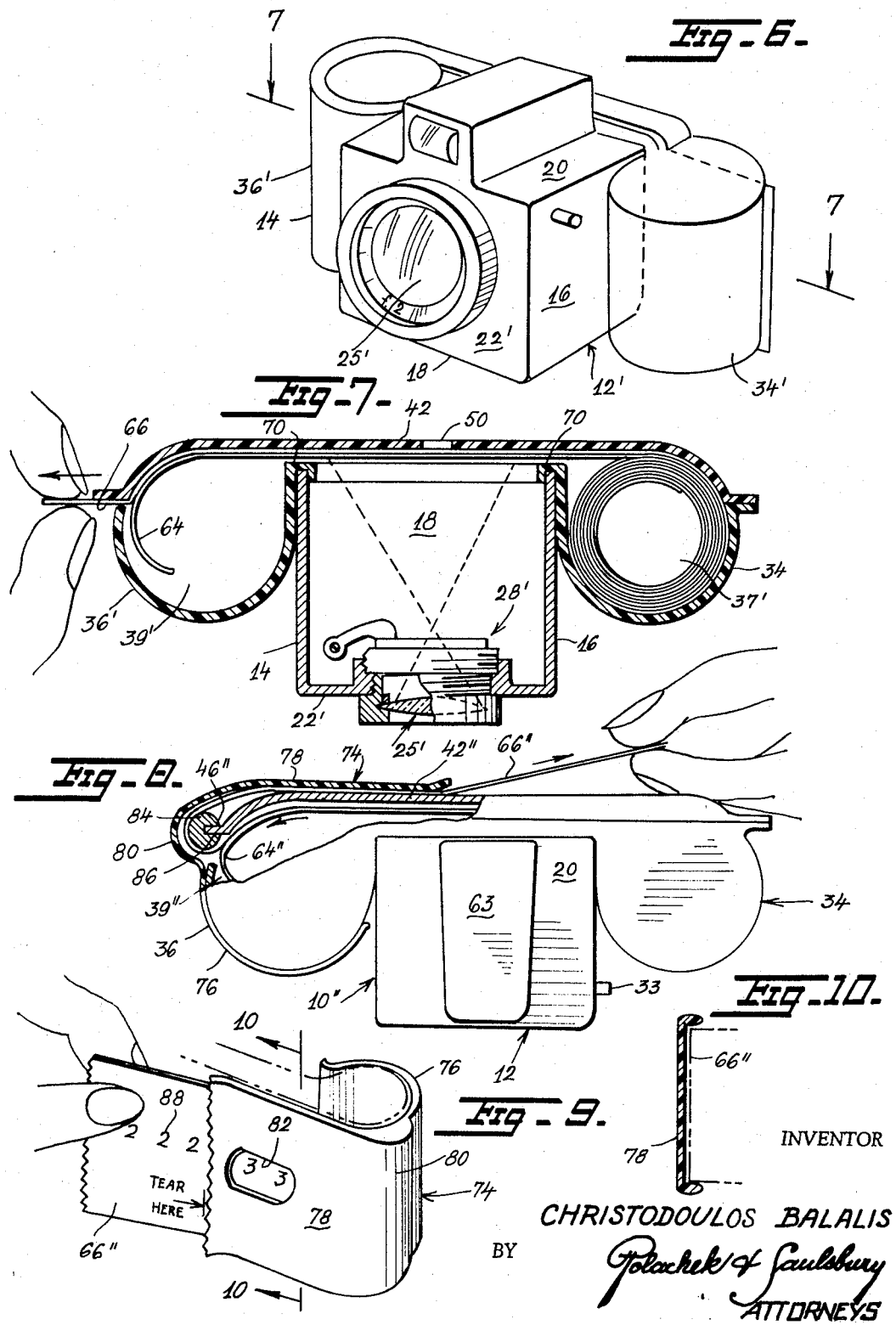

3,412,662
MINIATURE DISPOSABLE CAMERAS
Christodoulis Balalis, 5809 20th Ave.,
Brooklyn, N.Y. 11204
Filed Mar. 1, 1966, Ser. No. 530,955
5 Claims. (Cl. 95—11)

ABSTRACT OF THE DISCLOSURE

A disposable camera having a base member with an open end therein, an exposure device, auxiliary chambers for holding exposed and unexposed film respectively, and a detachable platen for enclosing the open end of the base member. A film exposing area is formed between the base member and the closure platen intermediate the auxiliary chambers. The camera utilizes a photosensitive film having a backing strip of light protective paper whereby the film may be manually advanced. A device for stripping the protective paper from the photosensitive film is provided adjacent to the chamber which holds the film after exposure.

---

This invention relates to miniature disposable cameras.

The object of the invention is to provide a small compact camera having a film operating mechanism in the form of a film and an exposed film portion placed in position for the taking of the next picture.

Another object of the invention is to provide a small compact camera having a film chamber with a detachable cover plate which when moved into the camera to operating position an unexposed film portion is automatically alined with the lens and the exposure opening of the camera so that a picture can be taken.

Still another object of the invention is to arrange the camera and the film unit so that the latter may be completely detached from the camera and another loaded film unit inserted and used.

A specific object to the invention is to provide a compact camera of a cost which makes it economical to dispose of the camera after a single use.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a spread perspective view of a minature camera embodying one form of the invention.

FIG. 2 is a sectional view taken on the plane of the line 2—2 of FIG. 1 in assembled condition, with a film shown in operative position.

FIG. 3 is a bottom plan view as seen from the line 3—3 of FIG. 2, with the fastening frame shown partly removed.

FIG. 4 is an enlarged sectional view taken on the plane of the line 4—4 of FIG. 3.

FIG. 5 is a perspective view of one end of the fastening frame.

FIG. 6 is a front perspective view of a miniature camera embodying a modified form of the invention.

FIG. 7 is a sectional view taken on the plane of the line 7—7 of FIG. 6.

FIG. 8 is a slide elevational view thereof partly in section.

FIG. 9 is a perspective view of one end of the film magazine, and;

FIG. 10 is a cross-sectional view taken on the line 10—10 of FIG. 9.

Referring now in detail to the various views of the drawings, in FIG. 1, a miniature disposable camera 10 is illustrated in diassembled formation. The camera 10 is composed of suitable plastic material and comprises a frame-like base 11 supporting an integral main casing provided with a substantially square shaped box-like body 12 having flat tapering side walls 14, 16, 18, 20 and flat top wall 22, the bottom of the box-like body being open. The entire camera mechanism is contained in the body 12. An opening 24 is formed in the top wall 22 and mounted therein is a lens 25. Under the lens 22 and closely spaced therefrom there is a partition wall 26 with a central opening 27 and behind the wall 26 and slidable therealong there is a shutter 28 having an exposure opening 30 adapted to align with opening 27, the shutter sliding transversely in guides 32 and movable by a button 33 projecting through an opening 35 in the side wall 16 of the box-like body 12.

In accordance with the invention, a film magazine is formed integrally or molded to the body 12 consisting of spaced hollow semi-cylindrical auxiliary casings 34 and 36 constituting chambers 37 and 39 on the base 23 on both sides of the body at the bottoms of the side walls 14 and 16. A perpendicular flange 38 is formed on one end of the base frame 23 and the other end has a felt strip 40 secured therealong, on its under surface by adhesive. A molded plastic shallow pan-like closure plate 42 closes openings in the base frame and body 12. The plate 42 has an end flange 44 seated on the flanged end of the base frame 23 and coacts with the flange 38 to prevent entrance of light thereat. The other end of the plate 42 has a flange 46 with a strip of felt 48 along its inner surface coacting with felt strip 40 thereby preventing entrance of light thereat. The plate 42 has a central window 50 whereby indicating numerals are visible.

The plate 42 is snapped into closing position on the base frame 23 with the flange 44 of the plate coacting with the flange 38 of the base frame 23 and with the felt strip 48 of the plate coacting with the felt strip 40 on the base frame. The plate 42 is held in closed position by a slidable U-shaped frame 52 formed of channel plastic material, the leg portions 54 thereof sliding over the overlapped long side edges 56 and 58 of the base frame 23 and plate 42 respectively, and the bight portion 60 thereof engaging over the flanged end of the base frame and plate mounting the felt strips 40 and 48. The bight portion 60 is formed with a central slot 62. The box-like body 12 may be provided with a view finder 63 which may be of any of the usual types. The bottom of the main casing 12 and the closure plate 42 constitute a main film chamber 65.

The box-like body 12 of the main casing constitutes an image chamber and the chambers 37 and 39 constitute compartments for holding a film assembly including a length of film 64 attached to a backing strip of light protective paper 66. The film assembly is initially placed in the film magazine by loading the chambers 37 with a spiral roll of the film assembly passing the film assembly between the inner ends of the side walls 14 and 16 of the body 12 and the closure plate 42 into the chamber 39 where the paper 66 is separated from the film 64 and the end of the paper extended through the felt strips 40 and 48 in the opening in the base frame, and out through the slot 62 in the bight portion 60 of the fastening frame 52 to the exterior thereof where it is grasped by the fingers of the user. The bent wall of the chambers 39 together with the inherent curling tendency of the film 64, causes the film 64 to be wound into a spiral roll in compartment 39. The film and backing paper are maintained in flat supported engagement with the inner ends of the side walls 14 and 16 of the main casing due to their natural resistance to being simultaneously fixed in transverse directions.

In use, film assembly is loaded into chamber 37 in spiral roll formation in unexposed condition and runs through a film passage to the image chamber in the box-like body 12 and thence to the chamber 39 where it is exposed. Normally the opening 27 in the partition wall 26 and lens 25 are in alignment and the shutter 28 is closed. The user peeks through the view finder 63 and by any well known means in the camera at such as the button 33 operates the shutter 28 in order to move the shutter opening 30 across the picture or exposure window 27 to expose the film 64 which is distended therebehind, and the picture is taken.

After the picture is taken and in order to make ready for the next picture, the user manually pulls the backing sheet 66 out of the film chamber 39 as shown in FIG. 2, a distance equal to a picture frame, the film 64 bending around the wall of the chamber 36 and being guided therearound by said wall as seen in FIG. 2. The backing sheet moves outwardly between the felt strips 40 and 48 which prevent light from entering thereat.

The invention contemplates that after exposure of the film, the camera may be returned to the seller for development of the film at which time the camera may be disposed of as the cost of manufacture is very reasonable.

In the modification of the invention shown in FIGS. 6 and 7, the magazine unit is separate from the box-like body 12' and the mounting for the lens 25' and the shutter mechanism 28' are supported on the top wall 22'. In this form, the free ends of the walls of the auxiliary casings 34' and 36' are formed with socketed flanges 70 to receive the ends of the side walls of the box-like body 12' removably therein.

In all other respects, the camera 10' shown in FIGS. 6 and 7 is similar to the camera 10 of FIG. 1 and similar reference numerals are used to indicate similar parts.

It is intended that the camera 10' with exposed film be returned to the seller for development of the film and disposal if desired.

The camera 10" shown in FIGS. 8 to 10, inclusive, is modified to the extent of adding means for separating the backing sheet 66" from the film strip 64" and directing the film strip 64" into the chambers 39" where it is guided around the wall of the chambers into a spiral roll. This separating means includes a plastic plate member 74 slightly wider than the width of the film assembly consisting of the backing sheet 66" and the strip of film 64". The plate member 74, at one end, has a curved body portion 76 of similar curvature to the curvature of the wall of the chamber 39", which body portion 76 is adapted to be snapped over the outer surface of the wall of chamber 39".

At its other end the plate member 74 has a flat body portion 78 adapted to overlie the magazine closure plate 42" in closely spaced relation thereto. Interposed between the curved end portion 76 and the flat end portion 78 there is an integral transversely disposed bulged portion 80. The flat body portion 78 is formed with a central window 82. An elongated solid cylindrical member 84 having an elongated slot 86 extending from end to end thereof for receiving the flanged end 46" of the cover plate 42" is disposed between the end of the cover plate 42" and the adjacent end wall of the chamber 39" and serves as a guide for pulling the backing sheet 66" off of and away from the film 64" whereby the end of the backing sheet is guided rearwardly under the flat body portion 78 of the plate 74 and outwardly of the free end thereof for grasping by the fingers of the user. The film 64" when separated from the backing sheet curls around into a roll in chamber 39". The backing sheet 66" may have indicia thereon such as indicating numerals 88 visible through the window 82 formed in the flat body portion 78 of the plate, 74.

In all other respects the camera 10" is similar to camera 10 and similar reference numerals are used to indicate similar parts.

It is contemplated that this camera 10" with exposed film 64" be returned to the seller for developing the film and for reuse if desired.

While I have illustrated and described the preferred embodiments of my invention, it is to be understood that I do not limit myself to the precise constructions therein disclosed and that various changes and modifications may be made within the scope of the invention as defined in the appended claims.

What I claim is:

1. A roll film camera comprising a rectangular shaped base frame, a box-like casing mounted on the base frame, said casing having side walls and a top wall and being open at the bottom, a partition wall across the casing adjacent the top wall forming a shutter chamber and a lens chamber, said partition wall having a picture opening therein, a shutter in the shutter chamber at the top end thereof, said shutter having an exposure opening movable across the opening in the partition wall for exposure of the film therethrough, means for moving said shutter, a lens in the lens chamber, a rectangular pan-shaped plate detachably mounted on the base frame closing the opening in the base frame and in the bottom of the casing, said closure plate and bottom of the casing defining a film chamber, means for fastening the closure plate to the base frame, integral auxiliary hollow curved casings on the base frame at opposed sides of the main casing constituting auxiliary film chambers one of said auxiliary chambers adapted to house a roll end of a film assembly including a length of film superposed on and attached to a paper backing sheet, said roll end constituting the supply-roll, the other of said auxiliary chambers adapted to receive the other end of said film assembly, said base frame having means for separating the backing sheet from the length of film of the film assembly, said last-named auxiliary casing having means for curling said other end of the film into roll formation constituting a take-up roll and means for moving said film assembly across the main and auxiliary film chambers, the means for fastening the closure plate to the base frame comprising a removable U-shaped frame, the legs and bight portions thereof being channel-shaped in cross section, the bight portion having a central slot therein, the leg portions slidable over the long edges of the base frame, the bight portion overlapping one end of the base frame.

2. A roll film camera as defined in claim 1 wherein the means for separating the backing sheet from the film is formed by a passage between the base frame and said other auxiliary casing and by the slot in the bight portion of the U-shaped frame for fastening the closure plate to the base frame.

3. A roll film camera defined in claim 2 wherein the means for moving the film assembly across the main and auxiliary film chambers is constituted by the externally protruding end of the backing sheet protruding through the passage between the base frame and the other auxiliary casing and through the slot in the bight portion of the U-shaped frame for fastening the closure plate to the base frame.

4. A roll film camera as defined in claim 1 wherein the means for moving the shutter comprises a button extending exteriorally of the main casing and operatively connected to the shutter, the means for separating the backing sheet from the film is formed by a passage between the base frame and said other auxiliary casing and by the slot in the bight portion of the U-shaped frame for fastening the closure plate to the base frame.

5. A roll film camera as defined in claim 4 wherein the means for curling the other end of the film is constituted by the curved wall of said other auxiliary casing.

References Cited

UNITED STATES PATENTS

| | | | |
|---|---|---|---|
| 2,394,711 | 2/1946 | Miesegaes | 95—31 XR |
| 2,557,297 | 6/1951 | Lea | 95—31 |
| 2,933,027 | 4/1960 | Hollingworth et al. | 95—31 |
| 3,247,773 | 4/1966 | Doblin et al. | 95—31 |

NORTON ANSHER, *Primary Examiner.*

F. L. BRAUN, *Assistant Examiner.*